United States Patent [19]

Constable

[11] Patent Number: 5,567,543
[45] Date of Patent: Oct. 22, 1996

[54] FILMSTRIP AND FLEXIBLE BATTERY UNIT

[75] Inventor: Douglas W. Constable, Rochester, N.Y.

[73] Assignee: Eastman Kodak Company, Rochester, N.Y.

[21] Appl. No.: 439,331

[22] Filed: May 11, 1995

[51] Int. Cl.$^6$ .................................... H01M 6/12
[52] U.S. Cl. .......................... 429/127; 429/160; 429/162; 396/301; 396/512
[58] Field of Search .................................... 429/162, 160, 429/8, 127; 354/83, 275, 276, 174, 202

[56] References Cited

U.S. PATENT DOCUMENTS

| | | | |
|---|---|---|---|
| 3,967,292 | 6/1976 | Delahunt | 354/174 |
| 4,188,105 | 2/1980 | Erlichman | 354/202 |
| 4,427,748 | 1/1984 | Land | 429/82 |
| 5,326,652 | 7/1994 | Lake | 429/127 |

OTHER PUBLICATIONS

Industry Week; Dec. 19, 1994; pp. 38–42; Technology Of The Year; Bellcore; By Tim Stevens.

*Primary Examiner*—John S. Maples
*Attorney, Agent, or Firm*—Roger A. Fields

[57] ABSTRACT

A film and battery unit comprises a filmstrip having a photosensitive side with successive imaging areas at which respective exposures are to be made and a non-photosensitive side, and a thin, flat, flexible battery extending at least substantially along the non-photosensitive side of the filmstrip for providing electrical energy incidental to making the exposures, whereby the filmstrip and the flexible battery can be coiled into a roll inside a film cassette for example. Preferably, an adhesive releasably secures the flexible battery to the non-photosensitive side of the filmstrip to allow the flexible battery to be stripped from the filmstrip before the filmstrip is chemically processed to render the exposures visible.

11 Claims, 3 Drawing Sheets

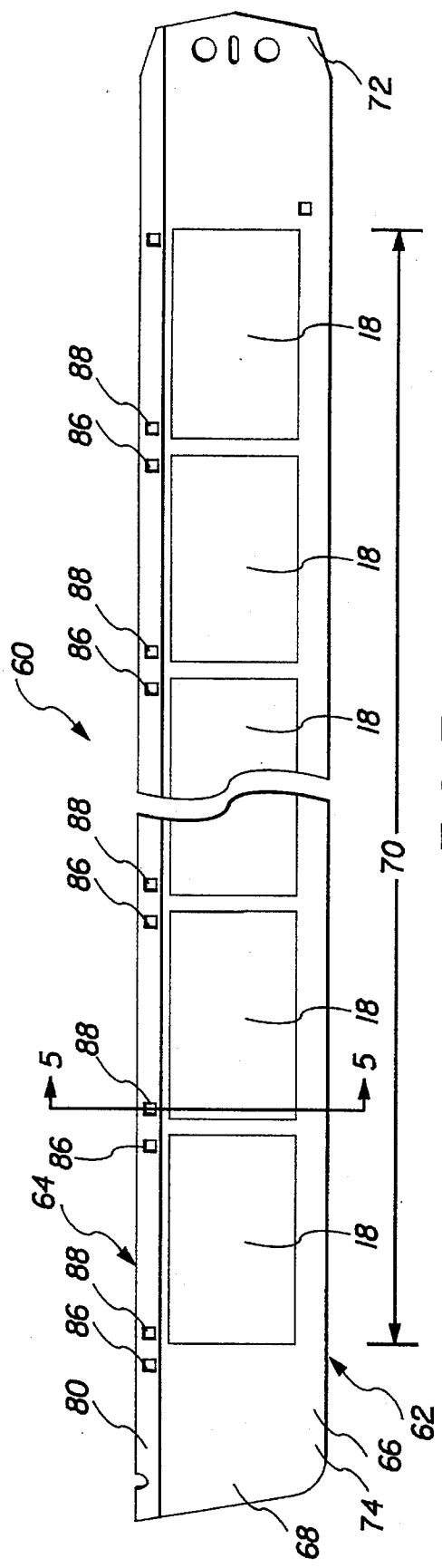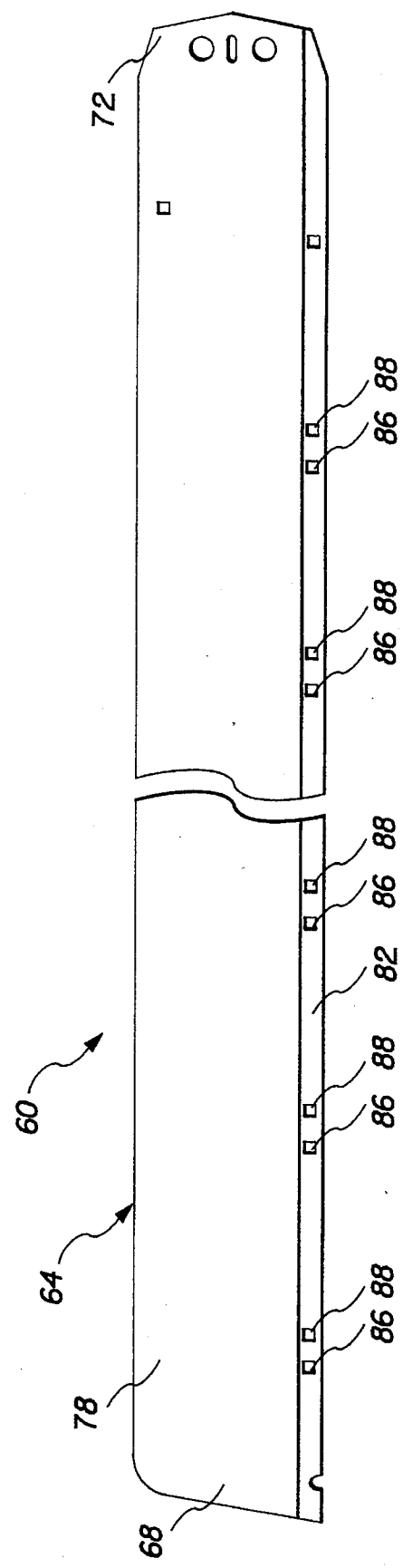

FILMSTRIP AND FLEXIBLE BATTERY UNIT

FIELD OF THE INVENTION

The invention relates generally to the field of photography, and in particular to a filmstrip and flexible battery unit.

BACKGROUND OF THE INVENTION

It is generally known in the field of instant photography for a film cassette to include discrete film sheets on which respective exposures are to be made in a camera and a separate planar battery which provides electrical energy necessary to operate an exposure control, film transport, and flash unit in the camera. When all of the film sheets in the cassette are exposed, the cassette with the battery is discarded.

Conversely, in non-instant traditional photography the film cassette only includes a filmstrip. The battery is a conventional off-the-shelf item which is not included in the cassette.

SUMMARY OF THE INVENTION

According to the invention, a film and battery unit comprises:

a filmstrip having a photosensitive side with successive imaging area is at which respective exposures are to be made and a non-photosensitive side; and a thin, flat, flexible battery extending at least substantially along the non-photosensitive side of the filmstrip for providing electrical energy incidental to making the exposures, whereby the filmstrip and the flexible battery can be coiled into a roll inside a film cassette for example.

Preferably, an adhesive releasably secures the flexible battery toe the non-photosensitive side of the filmstrip to allow the flexible battery to be stripped from the filmstrip before the filmstrip is chemically processed to render the exposures visible.

In one embodiment of the invention, the flexible battery includes a plurality of individual cells located one after the other at least substantially along the non-photosensitive side of the filmstrip, and a conductive strip connects the individual cells in series and has respective anode and cathode electrodes for each of the cells.

In an alternative embodiment of the invention, the flexible battery includes an anode layer and a cathode layer in superposed relationship. The filmstrip includes an emulsion layer overlying the anode layer but leaving an edge portion of the anode layer exposed. An insulation strip overlies an edge portion of the cathode layer contiguous with the edge portion of the anode layer that is exposed to prevent the edge portion of the anode layer that is exposed from contacting the cathode layer when the filmstrip and the flexible battery are coiled into a roll.

In either embodiment, the flexible battery and/or the filmstrip include film metering perforations.

BRIEF DESCRIPTION OF THE DRAWINGS

FIGS. 3 and 4 are plan views of reverse sides of an alternative embodiment of the film and flexible battery unit.

DETAILED DESCRIPTION OF THE INVENTION

The invention is disclosed as being embodied preferably in a filmstrip and flexible battery unit. Because many features of a filmstrip and a flexible battery are known, the description which follows is directed in particular only to those elements forming part of or cooperating directly with the disclosed embodiment. It is to be understood, however, that other elements may take various forms known to a person of ordinary skill in the art.

First Embodiment

Figure 1:
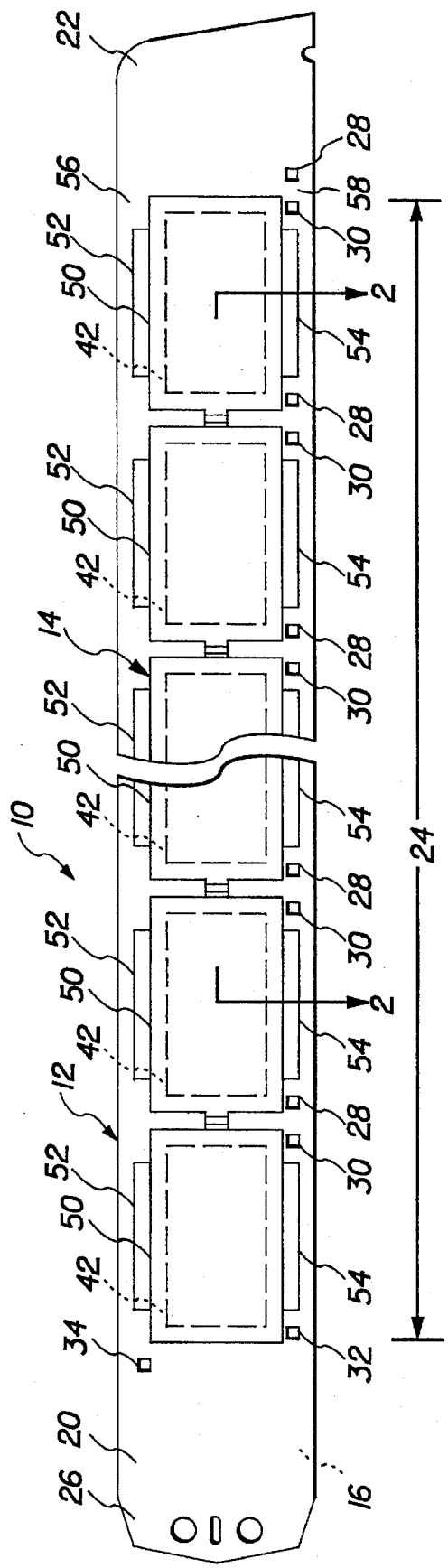
FIG. 1 is a plan view of one side of a film and flexible battery unit according to one embodiment of the invention.
Figure 2:
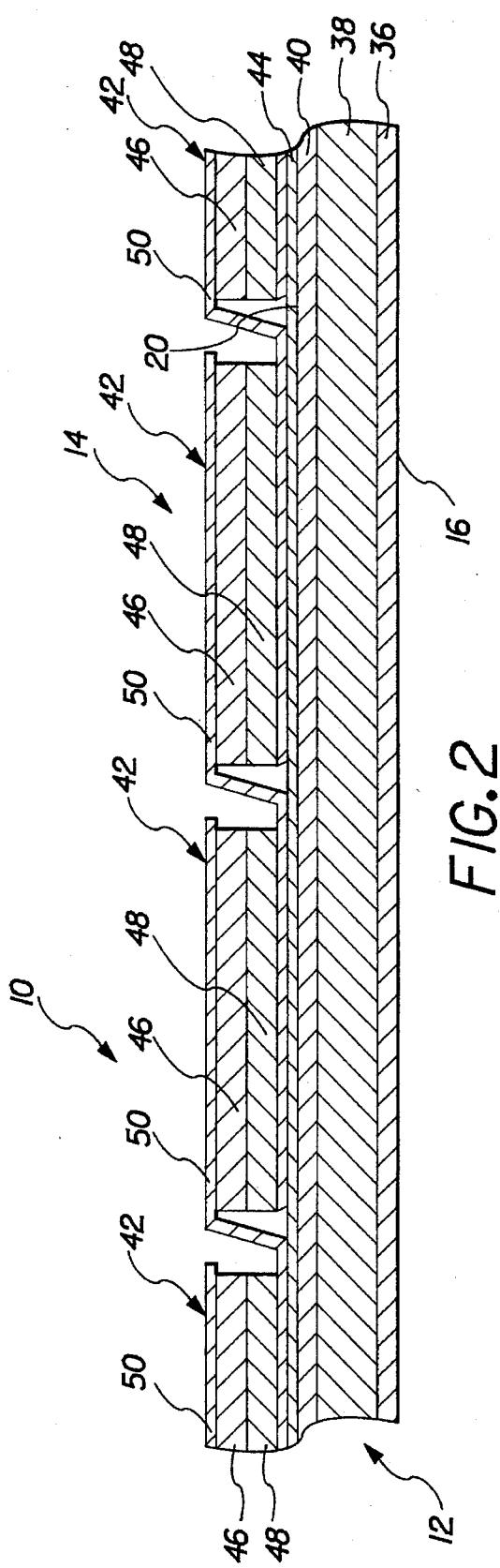
FIG. 2 is a cross-section view of the film and flexible battery unit as seen in the direction of the arrowed line 2—2 in FIG. 1.

A filmstrip and flexible battery unit 10 is shown in FIGS. 1 and 2 comprising a filmstrip 12 and a multi-cell, thin, flat, planar battery 14 which, together, can be coiled into a roll inside a film cassette for example.

The filmstrip 12 has a photosensitive side 16 with successive imaging areas 18 at which respective exposures are to be made and a non-photosensitive side 20, and is divided into a relatively short film leader portion 22, a relatively long film imaging portion 24 including the imaging areas 18, and a relatively short film trailer portion 26. See FIGS. 1 and 3. A pair of anticipation and metering perforations 28 and 30 are provided for each of the imaging areas 18, and single end-of-roll and turnaround perforations 32 and 34 are provided proximate the film trailer portion 26. As shown in FIG. 2, the filmstrip 12 has three layers, a non-conductive emulsion layer 36 including the photosensitive side 16, a non-conductive base layer 38, and a non-conductive transparent magnetic overcoat layer 40 including the non-photosensitive side 20.

The flexible battery 14 comprises a number of identical, evenly spaced cells 42 secured to the non-photosensitive side 20 of the film imaging portion 24 of the filmstrip 12 via a known non-conductive adhesive 44. The adhesive 44 secures the respective cells 42 opposite the imaging areas 18 as shown in FIG. 1, and is a releasable type which allows the flexible battery 14 to be stripped from the filmstrip 12 before the filmstrip is chemically processed to render the exposures made at the imaging areas visible. As shown in FIG. 2, each of the cells 42 have a planar anode layer 46 and a planar cathode layer 48 in superposed relationship. A number of conductive strips 50 connect the respective cells 42 in series. The conductive strips 50 each have integral portions forming a pair of anode and cathode electrodes 52 and 54 which are to be contacted in a camera to provide electrical energy incidental to making the exposures in the camera. The anode electrode 52 depends from atop the planar anode layer 46 onto a longitudinal edge portion 56 of the filmstrip 12, and the cathode electrode 54 extends from beneath the planar cathode layer 48 to an opposite edge portion 58 of the filmstrip.

An example of the technology from which the flexible battery 14 is derived is known as "the Bellcore battery system", and is described in the publication INDUSTRY WEEK, Dec. 19, 1994, pages 38, 39, 40 and 42, incorporated in this patent application. The Bellcore battery system is a thin-film plastic battery which can be cut, bent, and punched with holes, without leaking.

Second Embodiment

Figure 5:
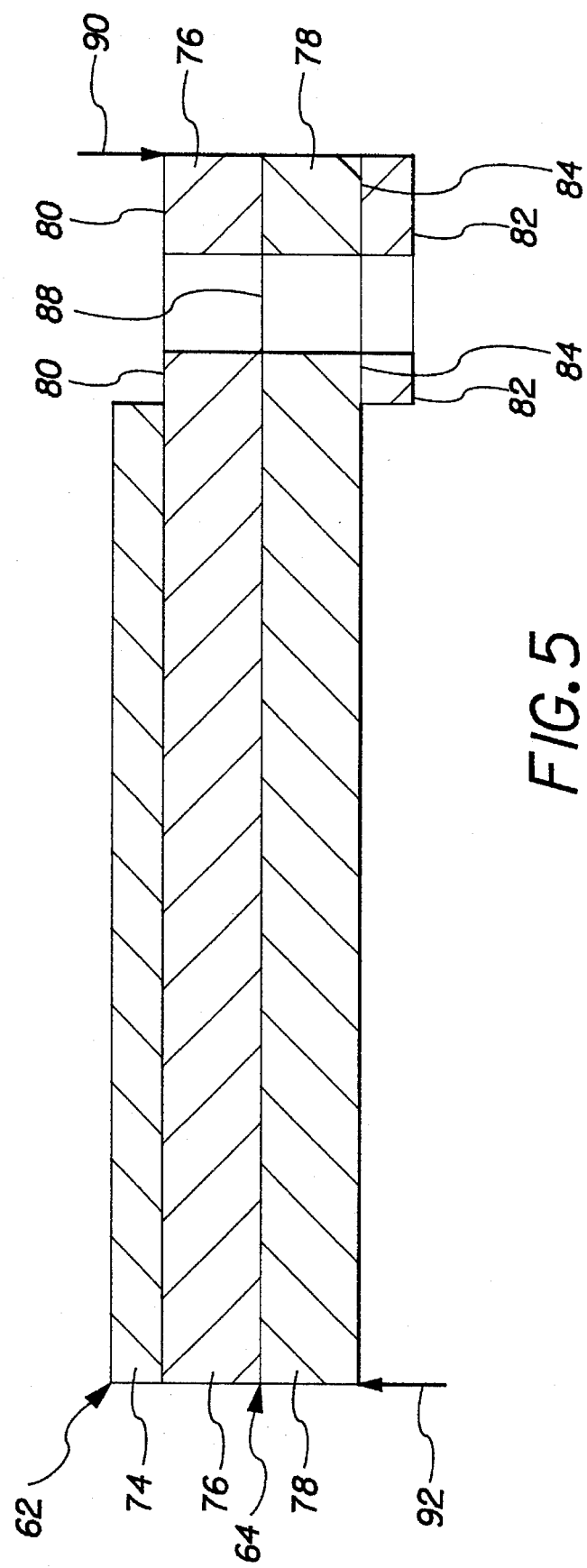
FIG. 5 is a cross-section view of the film and flexible battery unit as seen in the direction of the arrowed line 5—5 in FIG. 3.

A filmstrip and flexible battery unit 60 is shown in FIGS. 3, 4, and 5 comprising a filmstrip 62 and a single-cell, flat, planar battery 64 which, together, can be coiled into a roll inside a film cassette for example.

The filmstrip 62 has a photosensitive side 66 with successive imaging areas 18 at which respective exposures are to be made, and is divided into a relatively short film leader portion 68, a relatively long film imaging portion 70 including the imaging areas 18, and a relatively short film trailer portion 72. As shown in FIG. 5, the filmstrip 62 has a single layer, a non-conductive emulsion layer 74 including the photosensitive side 66.

The flexible battery 64 comprises a single planar anode layer 76 and a single planar cathode layer 78 which with the emulsion layer 74 are in superposed relationship as shown in FIG. 5. The emulsion layer 74 overlies the anode layer 76 but leaves a longitudinal edge portion 80 of the anode layer exposed or uncovered. See FIG. 3. An insulation strip 82 overlies a longitudinal edge portion 84 of the planar cathode layer 78 contiguous with the longitudinal edge portion 80. See FIG. 4. The insulation strip 82 acts as a shield to prevent the longitudinal edge portion 80 from contacting the planar cathode layer 78 when the filmstrip 62 and the flexible battery 64 are coiled into a roll. The longitudinal edge portions 80 and 84 together with the insulation strip 82 have common pairs of anticipation and metering perforations 86 and 88 provided for the respective imaging areas 18.

Two arrows 90 and 92 indicate in FIG. 5 respective portions of the longitudinal edge portion 80 and the planar cathode layer 78 which are to be contacted in a camera to provide electrical energy incidental to making the exposures in the camera.

The invention has been described with reference to a preferred embodiment. However, it will be appreciated that variations and modifications can be effected by a person of ordinary skill in the art without departing from the scope of the invention.

PARTS LIST 10. filmstrip and flexible battery unit
12. filmstrip
14. flexible battery.
16. photosensitive film side
18. film imaging areas
20. non-photosensitive film side
22. film leader portion
24. film imaging portion
26. film trailer portion
28. anticipation perforations
30. metering perforations
32. end-of-roll perforation
34. turn around perforation
36. emulsion layer
38. base layer
40. transparent magnetic overcoat layer
42. cells
44. adhesive
46. planar anode layers
48. planar cathode layers
50. conductive strips
52. strip anode electrodes
54. strip cathode electrodes
56. longitudinal film edge portion
58. longitudinal film edge portion
60. filmstrip and flexible battery unit
62. filmstrip
64. flexible battery
66. photosensitive film side
68. film leader portion
70. film imaging portion
72. film trailer portion
74. emulsion layer
76. planar anode layer
78. planar cathode layer
80. longitudinal anode edge portion
82. insulation strip
84. longitudinal cathode edge portion
86. anticipation perforations
88. metering perforations
90. arrow
92. arrow

I claim:

1. A film and battery unit comprising:

a filmstrip having a photosensitive side with successive imaging areas at which respective exposures are to be made and a non-photosensitive side; and a thin, flat, flexible battery extending at least substantially along the non-photosensitive side of said filmstrip for providing electrical energy relating to making the exposures, whereby said filmstrip and said flexible battery can be coiled into a roll.

2. A film and battery unit as recited in claim 1, wherein said flexible battery and said imaging areas on the non-photosensitive and photosensitive sides of said filmstrip are in superposed relationship.

3. A film and battery unit as recited in claim 1, wherein an adhesive releasably secures said flexible battery to the non-photosensitive side of said filmstrip to allow the flexible battery to be stripped from the filmstrip before the filmstrip is chemically processed to render the exposures visible.

4. A film and battery unit as recited in claim 1, wherein said flexible battery includes a plurality of individual cells connected in series at least substantially along the non-photosensitive side of said filmstrip.

5. A film and battery unit as recited in claim 1, wherein said flexible battery includes a plurality of individual cells located one after the other at least substantially along the non-photosensitive side of said filmstrip.

6. A film and battery unit as recited in claim 5, wherein a conductive strip connects said individual cells in series and has respective anode and cathode electrodes form each of the cells.

7. A film and battery unit as recited in claim 6, wherein said anode and cathode electrodes are located on respective edge portions of the non-photosensitive side of said filmstrip adjacent to each of said cells.

8. A film and battery unit as recited in claim 1, wherein said flexible battery has film metering perforations corresponding to the exposures.

9. A film and battery unit as recited in claim 1, wherein said flexible battery includes an anode layer and a cathode layer in superposed relationship, said filmstrip includes an emulsion layer overlying said anode layer but leaving an edge portion of the anode layer exposed, and an insulation strip overlies an edge portion of said cathode layer contiguous with said edge portion of the anode layer that is exposed to prevent the edge portion of the anode layer that is exposed from contacting the cathode layer when said filmstrip and said flexible battery are coiled into a roll.

10. A film and battery unit as recited in claim 9, wherein said edge portions of the anode and cathode layers and said insulation strip have common film metering perforations corresponding to the exposures.

11. A film and battery unit as recited in claim 1, wherein said flexible battery includes anode and cathode layers and said filmstrip includes an emulsion layer in superposed relationship with said anode and cathode layers, and at least said anode and cathode layers have common film metering perforations corresponding to the exposures.

* * * * *